United States Patent [19]
Livingston

[11] Patent Number: 5,918,305
[45] Date of Patent: Jun. 29, 1999

[54] IMAGING SELF-REFERENCING TRACKER AND ASSOCIATED METHODOLOGY

[75] Inventor: Peter M. Livingston, Palos Verdes, Calif.

[73] Assignee: TRW Inc., Redondo Beach, Calif.

[21] Appl. No.: 08/919,080

[22] Filed: Aug. 27, 1997

[51] Int. Cl.[6] .............................. F41G 3/00; F41B 15/00; F41H 13/00

[52] U.S. Cl. ........................................... 89/1.11; 89/41.01

[58] Field of Search ................................ 89/41.06, 41.19, 89/41.21, 1.11, 41.01; 244/3.11, 3.13

[56] References Cited

U.S. PATENT DOCUMENTS

| | | | |
|---|---|---|---|
| 3,427,611 | 2/1969 | Enenstein | 89/1.11 |
| 4,386,848 | 6/1983 | Clendenin et al. | 356/5 |
| 4,562,769 | 1/1986 | Heynau et al. | 89/41.06 |
| 4,676,455 | 6/1987 | Diehl et al. | 244/3.13 |
| 4,917,490 | 4/1990 | Schaffer et al. | 356/152 |
| 5,197,691 | 3/1993 | Amon et al. | 244/3.13 |
| 5,198,607 | 3/1993 | Livingston et al. | 89/1.11 |
| 5,208,417 | 5/1993 | Langer et al. | 89/41.06 |
| 5,694,202 | 12/1997 | Mladjan et al. | 356/4.01 |
| 5,747,720 | 5/1998 | Schnurr et al. | 89/1.11 |

OTHER PUBLICATIONS

"Boresighting a Gaussian Beam on a Specular Target Point: A Method Using Conical Scan," Erteza, Ahmed, *Applied Optics*, vol. 15, 1976 pp. 656–660.

"Laser Beam Active Tracking for Specular Objects to Fractions of $\lambda/D$" Livingston, Peter, M., Jacoby, Jerold L., and Tierney, William S., *Applied Optics*, vol. 24, 1985 pp. 1919–1925.

*Primary Examiner*—Charles T. Jordan
*Assistant Examiner*—Christopher K. Montgomery
*Attorney, Agent, or Firm*—Michael S. Yatsko

[57] ABSTRACT

A method of maintaining a laser weapon target aim point. The method includes the step of selecting an aimpoint (42) on a target (24). The target is then engaged with a laser beam (23). The tracker (36) then receives target scene information, and detects both a target image and a target laser hit spot (40). The tracker (36) then determines the vector distance between the target aimpoint and the target laser hit spot, and drives the vector distance (70) to zero to close the loop between the target aimpoint and the target laser hit spot location. The method and system of the present invention thereby increase the probability of a target kill by enabling the tracking system to maintain a laser lock on the target aimpoint from an initial target engagement to a target kill stage.

16 Claims, 5 Drawing Sheets

IMAGING SELF-REFERENCING TRACKER AND ASSOCIATED METHODOLOGY

CROSS REFERENCE TO RELATED APPLICATIONS

The present application contains subject matter in common with pending U.S. patent application Ser. No. 08/920,538, filed on Aug. 27, 1997 entitled "Magic Mirror Hot Spot Tracker", and pending U.S. patent application Ser. No. 08/919,413, filed on Aug. 27, 1997 entitled "Dichroic Active Tracker", both of which are assigned to TRW, Inc., assignee of the present invention.

BACKGROUND OF THE INVENTION

1. Technical Field

The present invention relates generally to systems for tracking moving objects and, in particular, to a self-referencing, imaging tracker that allows a laser beam to be locked onto, and maintained at, a desired target aim point until a target kill is achieved.

2. Discussion

Image trackers are often used in conjunction with lasers or other weaponry to disable inflight missiles. Conventional image trackers presently employ only non-self-referencing schemes for directing a laser beam to a desired target aimpoint. In practice, this means that the laser beam direction in space is inferred from the tracker line of sight as the tracker tracks the missile.

Trackers using imaging, non-self-referencing techniques typically utilize one or more imaging devices, such as electronic cameras, that first determine an approximate, or wide field of view (WFOV) position, and then an instantaneous, or narrow field of view (NFOV), position of a targeted object in an open loop manner. A target coordinate system is then typically established by determining the centroid of the target image. After capturing the target image in the NFOV's track gate, the tracker, under servo-loop control, follows the target. In most instances, the tracker is physically mounted on gimbals in a beam pointer. Therefore, the pointer line-of-sight also tracks the target if the pointer and tracker are properly boresighted.

Although conventional imaging, non-self-referencing trackers often provide adequate target location functions, a number of limitations exist with such systems. For example, in medium wave forward looking infrared (FLIR) based trackers, the laser weapon used for target engagement often interferes with the tracker imaging system, as instantaneous non-specular return from the laser hit spot on the object often blinds the camera, or, at least causes the camera automatic gain control to reduce camera gain to accommodate the bright laser hit spot, thereby losing all target image information. Typically, the laser-reflected power is some 40 to 60 dB greater than the target thermal signature. Additionally, with regard to long wave FLIR based systems, bright thermal energy from heated war heads may also blind such systems, causing the systems to lose track of the targeted object.

Solutions to the above problems include programming the system to select a laser aim point outside of the narrow field of view (NFOV) and the use of short wave infrared (SWIR) track bands with active illumination, causing the laser return to be invisible to the NFOV SWIR camera. If the laser aim point is selected outside of the view of NFOV however, the laser beam pointing must be determined by feed forward estimation. Such an end point selection is undesirable, as it eliminates missile nose-kill possibilities, and is subject to estimation noise as explained earlier. Alternatively, if a short range IR track band is used, the laser beam pointing must also be done via feed forward estimation. Such a scheme increases the susceptibility of the tracker to atmospheric disturbances.

Additionally, with non-self-referencing imaging trackers, the tracker must be accurately boresighted on the line of sight with the laser weapon line of sight. Due to the design of such systems, it has been found difficult to maintain an accurate bore sight under adverse environmental conditions.

Self-referencing trackers solve the above described limitations of the conventional imaging, non-self-referencing open loop trackers by referencing the laser beam instantaneous position to the target image itself rather than to the tracker line-of-sight direction. Also, self-referencing trackers have fields of view that need not be bore sighted with the laser weapon, thereby subsequently minimizing the weight on the system gimbals and simplifying system transmit optics.

Presently, non-imaging self-referencing trackers, such as the systems disclosed in pending U.S. patent application Ser. No. 08/631,645, now U.S. Pat. No. 5,780,838, entitled "Laser Crossbody Tracking System and Method", and U.S. patent application Ser. No. 08/760,434, now U.S. Pat. No. 5,780,839, entitled "Laser Crossbody and Feature Curvature Tracker", both incorporated herein by reference, are known in the art.

Non-imaging self-referencing trackers are presently deployed as vernier trackers; that is, the trackers correct residual image jitter created by imperfect image tracker performance. Thus, the non-imaging tracker bears the major tracking burden for difficult targets, such as small artillery rounds or maneuvering cruise missiles. Non-imaging self-referencing trackers use the laser beam itself to seek and hold a glint, such as a cylindrical missile roll axis. Therefore, the laser beam positioning on the target becomes independent of tracker jitter in the dither direction and within the non-imaging tracker track bandwidth.

Although non-imaging self-referencing systems provide certain advantages over imaging, non-self-referencing systems, there is still room for improvement in the art. For example, there is a need for an imaging, self-referencing laser beam tracker that can be locked onto a desired target aim point, whether or not a glint is present at that point, and held on the aim point at will. In addition, there is a need for an imaging, self-referencing tracker that provides maximum noise immunity from atmospheric optical turbulence through measurement of the laser beam position relative to the position of the target, both seen through the same atmospheric path. There is also a need for an imaging, self-referencing tracker that reduces or eliminates the pointing error associated with the estimated aimpoint offset associated with conventional open loop trackers by measuring an actual laser hit spot location on the target relative to the target itself.

SUMMARY OF THE INVENTION

Accordingly, the present invention provides an imaging self-referencing tracker and associated method for tracking a moving object for laser weapon sighting purposes. The tracker is capable of locking a laser beam generated by a laser weapon onto a desired target aim point and maintaining the laser beam at the aim point indefinitely. The self-referencing imaging tracker of the present invention provides maximum noise immunity from atmospheric optical turbulence, as the position of the laser beam spot location on the target is measured relative to the target itself, and both the laser hit spot and target are viewed through the same atmospheric path. The tracker of the present invention thereby increases the kill capacity of an associated laser weapon, as the system allows the laser weapon to attack the weakest point of a target regardless of whether or not a glint is present at that point. The tracker of the present invention also increases the range of a laser weapon, as it is not limited by the tracker image detector.

More particularly, the present invention provides a method of maintaining a target aim point for a laser weapon. The method includes the steps of selecting an aimpoint on a target, and engaging the target with a laser beam. Both a target image and a laser hit spot are detected from target scene information. A vector distance between the target aimpoint and the target laser hit spot is then determined. The vector distance is driven to zero to close the loop between the target aimpoint and the target laser hit spot.

According to another preferred embodiment, the present invention provides a laser generator that generates a laser beam that engages a target and forms a laser hit spot thereon. An imager detects images of both the target and the target laser hit spot. A processor determines a vector distance between the target aimpoint and the target laser hit spot, and generates beam steering commands correlating to the vector distance. A beam steering device receives the beam steering commands and adjusts the laser beam generator in a manner that drives the vector distance to zero, and maintains the vector distance at zero, to lock the laser beam on the desired target aim point.

According to another preferred embodiment, the present invention provides for a laser illuminator operating at short IR wavelengths to illuminate the target, enhancing its short wavelength IR image. Received scattered power from the target is divided into a short wavelength component, directed to a short wavelength-sensitive detector array, and a mid IR component, produced by scattered laser weapon power, directed to a detector array not sensitive to the short wavelength IR component. Processing the target and hit spot images from these two coregistered arrays follows as described above.

DETAILED DESCRIPTION OF THE PREFERRED EMBODIMENT

Figure 1:
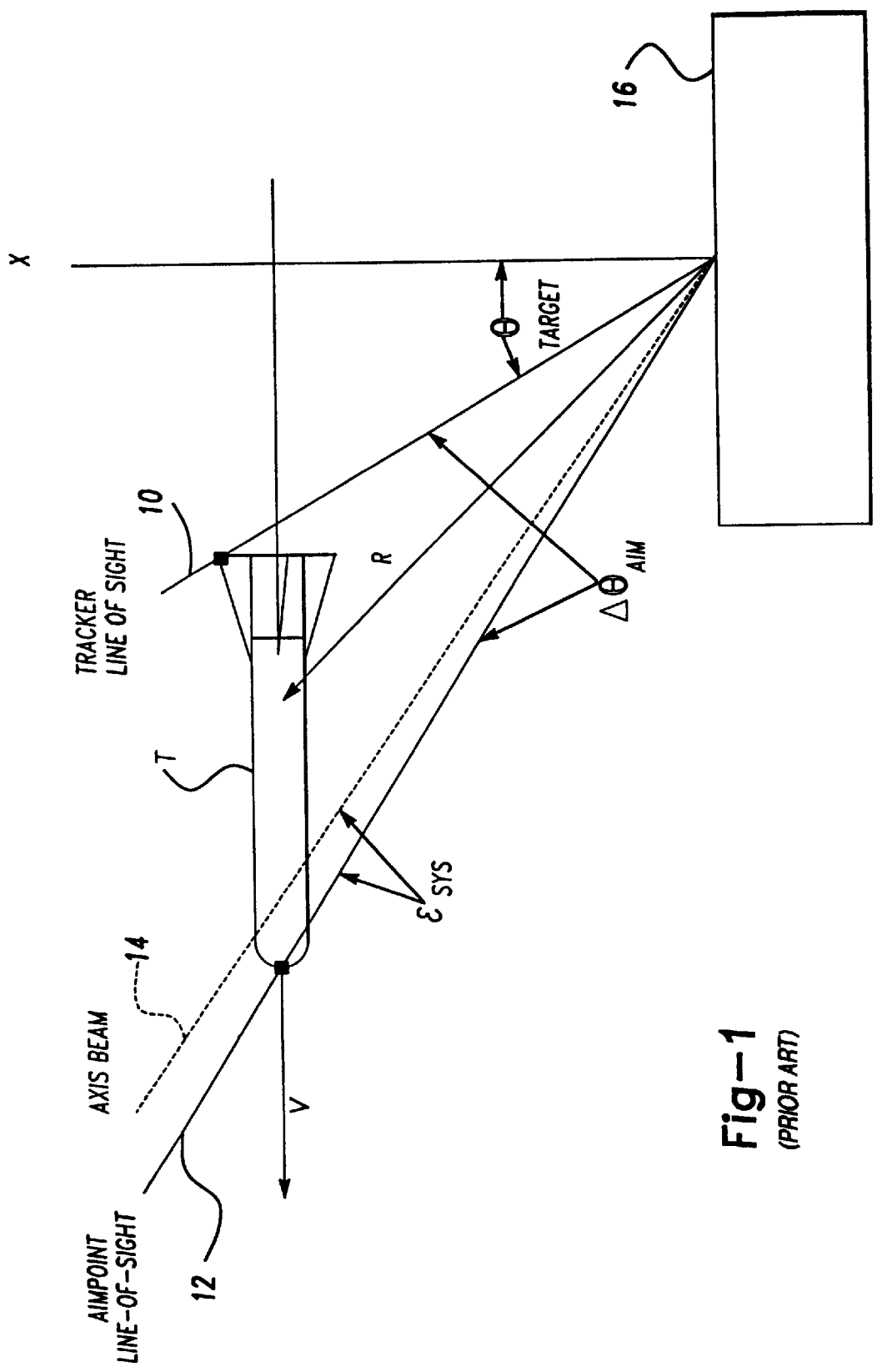
FIG. 1 illustrates the angular relationship between a laser weapon system and a target scene.

Referring to the drawings, FIG. 1 illustrates the dilemma facing current tracking technology; namely that the laser beam hit spot cannot co-exist within the tracker field-of-view. Yet when it is displaced away from the track point its placement accuracy and precision become increasingly poorer.

In FIG. 1, the angular relationship between the tracker line-of-sight directed to a desired trackpoint, 10, on a target T; the desired aimpoint line-of-sight, 12, and the actual beam line-of-sight, 14, are shown. The target T moving with a velocity V is located a distance R from the laser weapon system, 16. The tracker establishes the target angle $\theta_{target}$ with respect to an inertial frame fixed in the weapon system 16. In the present technology, the laser beam cannot fall within a narrow angular region about the tracker line-of-sight, called the tracker Narrow Field of View (not shown). Therefore the beam must be displaced by an amount, $\Delta\theta_{aim}$, from the tracker line-of-sight 10 in order to attack a desired point on the target M. However, it is well known in the art that $\Delta\theta_{aim}$ must be estimated from the measured target position R, determined by the tracker line-of-sight and the radar obtained target vector velocity V. The estimated $\Delta\theta_{aim}$ is subject to noise, illustrated by $\epsilon_{sys}$. Imaging non-self-referencing trackers have no means of controlling this error. As will now be described, the imaging, self-referencing tracker of the present invention eliminates $\epsilon_{sys}$ by determining the laser beam line-of-sight not be a prescribed offset as is presently done, but by measuring the actual hit spot position relative to the target itself.

Figure 2:
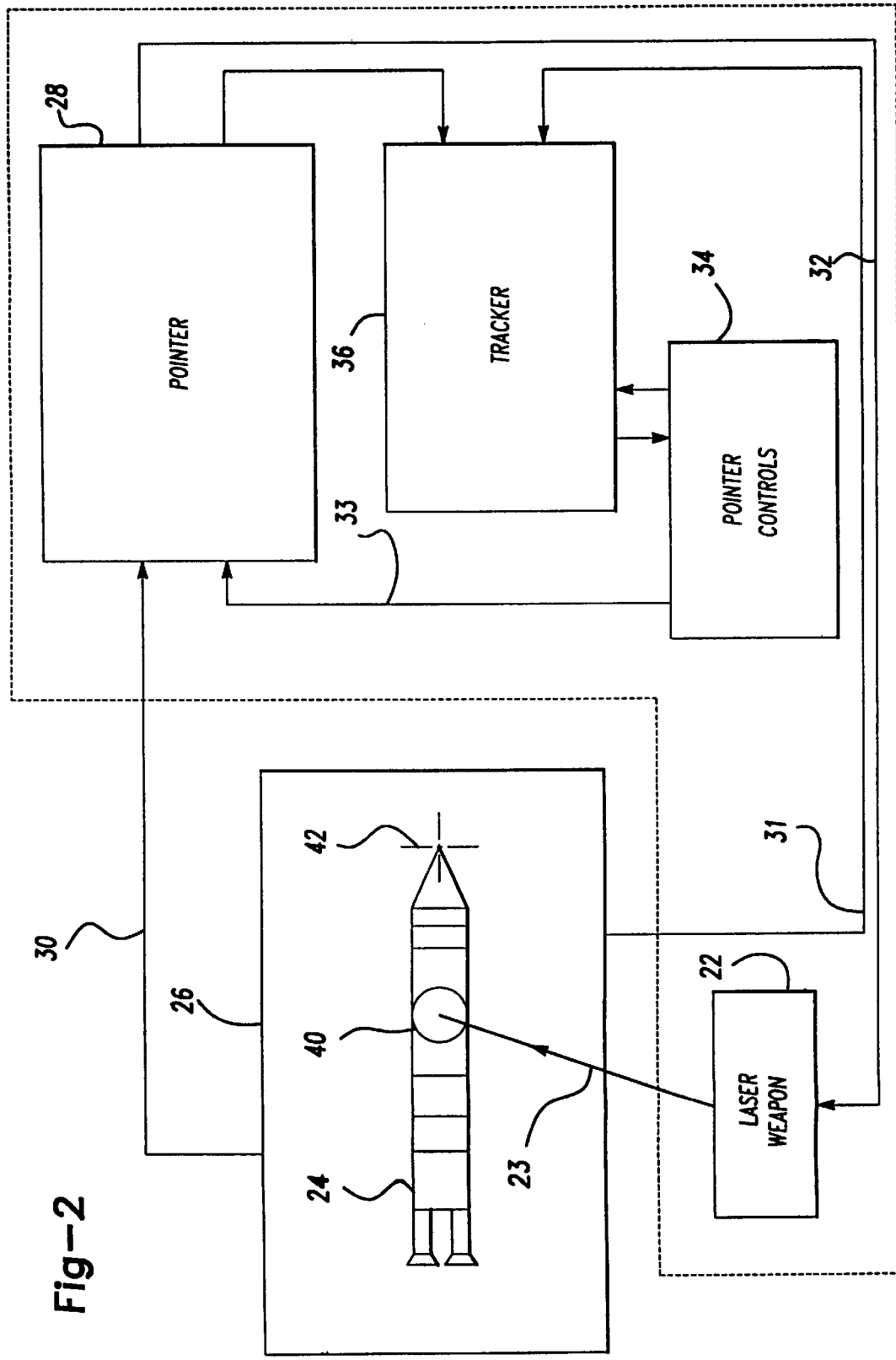
FIG. 2 is a system block diagram of a laser weapon system including an imaging self-referencing tracker according to a preferred embodiment of the present invention.

Referring generally to FIG. 2, a block diagram of a laser weapon system, including an imaging self-referencing tracker according to a preferred embodiment of the present invention, is shown generally at 20. The weapon system 20 includes a conventional laser weapon 22 that generates a high power laser beam 23. The generated laser beam engages a designated target, such as the missile 24, located within a target environment, or target scene, 26.

A weapon pointer 28 is coupled to the target environment at 30, by means of target imaging information as indicated generally at 31, and includes electromechanical beam steering equipment, coupled to the laser weapon at 32, that steers the laser beam 23 in response to laser beam steering commands 33 generated by pointer controls 34 and communicated to the pointer.

The pointer controls 34 include conventional control electronics programmed in accordance with the tracking methodology of the present invention. The pointer controls receive target imaging information 31 from an imaging, self-referencing tracker 36, and convert the information to the laser beam steering commands 33. In response to the commands, the pointer steers the laser beam from a point of engagement, or laser hit spot, 40 toward a designated target aimpoint 42.

Figure 3:
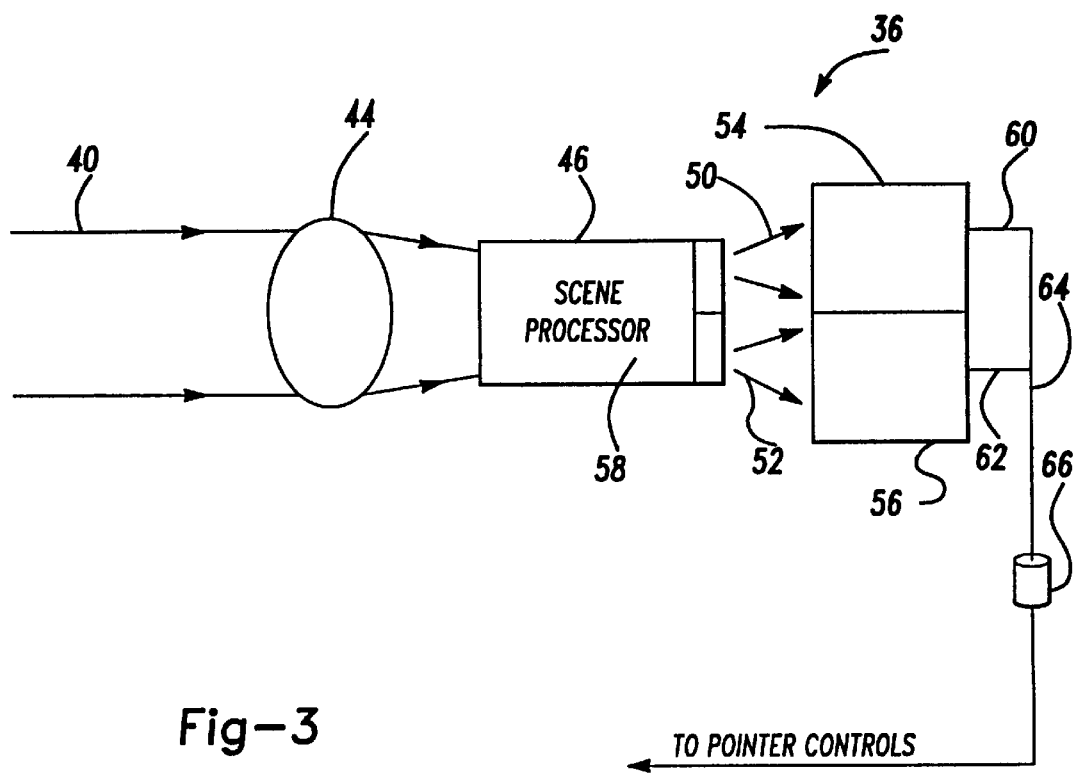
FIG. 3 is a more detailed system block diagram of a first embodiment of the tracker of the present invention shown in FIG. 2.

Turning now to FIG. 3, the tracker 36 according to a first embodiment of the present invention is shown in more detail. The tracker senses the target scene and receives scene information 40, in the form of missile body and hit spot radiation, through receiving optics 44. The radiation 40 passes through the receiving optics 44 to a scene processor 46, which conditions the radiation for use in tracking both the target and the laser hit spot. According to one embodiment of the present invention, the scene processor comprises a beam separating optical configuration. However, it should be appreciated that the images may also be separated by techniques such as programmable reflectance, polarization, and wavelength-based separation techniques.

After the images are separated, the scene processor separately images the target scene and the laser hit spot. The scene processor separates the target scene into a first beam of radiation 50 containing target image information and a second beam of radiation 52 containing laser hit spot image radiation. The scene processor then outputs the separated first and second beams of radiation to first and second imagers 54, 56, respectively.

The processor includes narrow band filters that allow only radiation in the target wavelength to pass to the first imager, and that allow only radiation in the laser hit spot wavelength to pass to the second imager. The first imager 54 detects the filtered target image information in the first beam of radiation and generates electrical signals, indicated generally at 60, in response thereto. The second imager 56 detects the filtered laser hit spot image information in the second beam of radiation and generates electrical signals, indicated generally at 62, in response thereto. The imagers preferably are formed from arrays of charge coupled device (CCD) detectors sensitive to radiation incident thereon, and generate electrical signals proportional in strength to the radiation incident thereon. Alternatively, the imaging apparatus may be a single detector array on which target and laser hit spot images are incident in an alternating manner.

Figure 4:
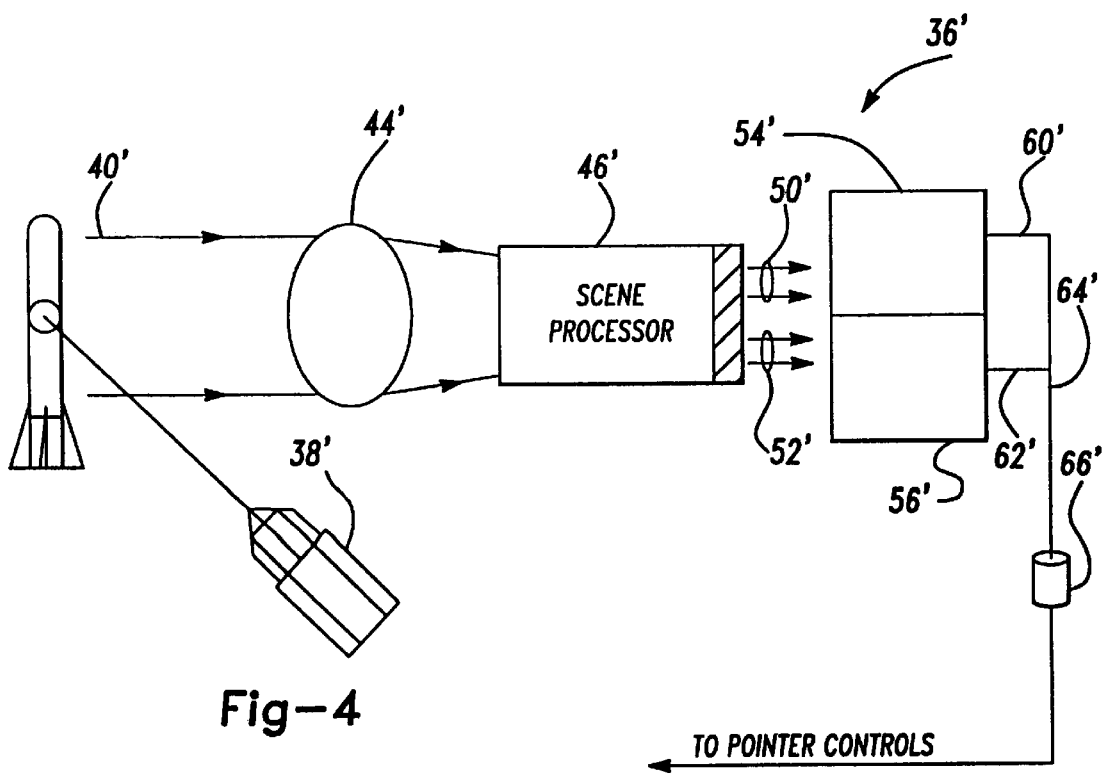
FIG. 4 illustrates a second embodiment of the tracker shown in FIG. 2.
Figure 5:
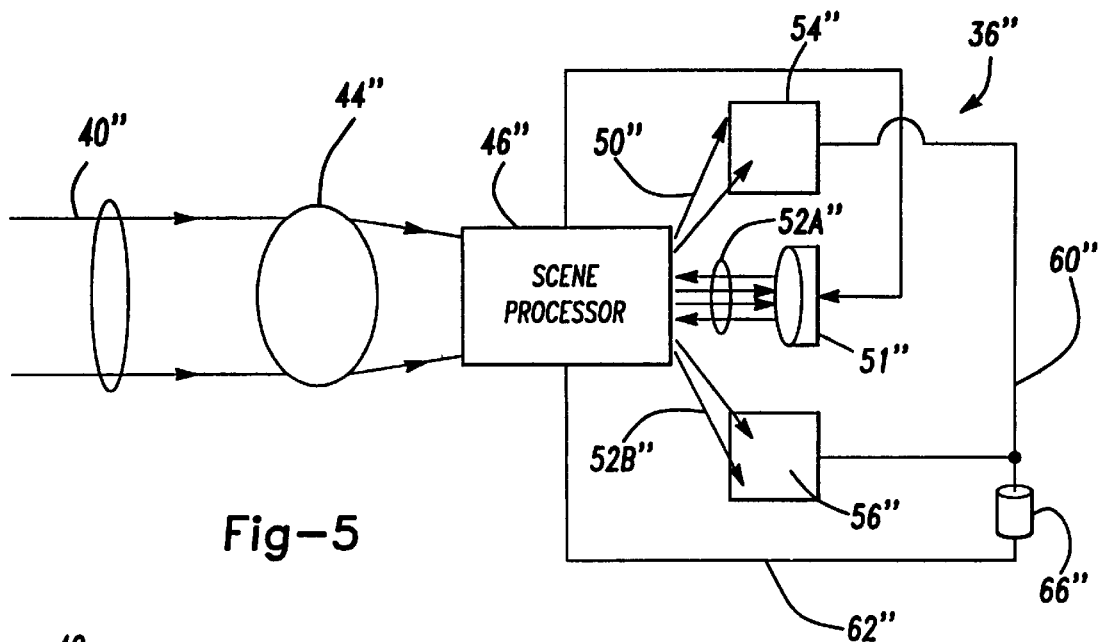
FIG. 5 illustrates a third embodiment of the tracker shown in FIG. 3.

Referring to FIG. 4, a second preferred embodiment of the present invention is shown at 36'. As above, the tracker senses the target scene and receives scene information 40' in the form of missile body and hit spot radiation throught receiving optics 44'. A laser illuminator 38' operates at short infrared (IR) wavelengths to illuminate a target, thereby enhancing the short wavelength IR image of the target. The processor 46' then separates the target scene into a first beam 50' of short wavelength infrared radiation from the laser illuminator as scattered off of the target, and a second beam 52' of mid infrared radiation produced by the laser weapon forming the laser hit spot on the target. The first beam of short wavelength infrared radiation 50' is directed to a short wavelength sensitive detector array 54'. The second beam of radiation 52' is directed to a detector array 56' that is sensitive to the mid infrared wavelength radiation. Because the detector arrays 54', 56' are only sensitive to radiation having a specific wavelength, band filters, such as the filters 58 shown in FIG. 3, are not required to filter the beams of radiation. Referring to FIG. 5, a third preferred embodiment of the present invention is shown at 36". Operation of the tracker 36" is identical to the tracker 36, the exception being that the scene processor 46" utilizes a controlled reflectance mirror 51" to separate the target image radiation 52a" from the laser hit spot image radiation 50". As shown, the mirror 51", which is preferably a flexure beam micro mirror array, receives target radiation 52a" from the processor after the processor initially separates the mid-IR laser hit spot radiation 50". The mirror 51" reflects radiation back through the processor, thereby changing the direction in polarity of the radiation to focus the radiation having changed polarity 52b" on the detector array 56" and thereby ensuring that only shortwave IR from the target image reaches the detector array 56".

Referring again to the tracker in FIG. 3, processing of the signals produced by the tracker detector arrays will now be described. Electronic position signals 60, 62 are output at 64 and co-registered in register 66 before being input into the pointer controls 30. The register 66 correlates pixels imaged from both the target image and the laser hit spot. The register facilitates processing of both sets of signals simultaneously to eliminate any time lag between the signals, thereby minimizing the introduction of aimpoint error. The tracker, in combination with the pointer 28 and the pointer controls 30, thereby effectively drives the difference vector, representing the spatial distance between the target aimpoint and the instantaneous position of the laser hit spot, to zero. Processing of position signals for the tracker embodiments 36', 36" is performed in like manners.

It should be appreciated that the above system may be retrofit into an existing weapon system through implementation of an additional servo loop into the existing system. The servo loop would make use of conventional high power beam steering mirrors (not shown) that provide fine beam pointing. Difference vector information would be summed in the beam control servo loop, thereby steering the beam to the aimpoint. As the mirrors approached the travel limit, commands would be sent to the outer pointer gimbals (not shown), causing them to move, and thus offloading the fast pointing mirror angles.

The above-described system represents a significant improvement over prior open loop, or non-self referencing, systems, as the system is not affected by thermal heating of the target. Therefore, the target aimpoint can include the target trackpoint regardless of the aimpoint location on the target. In addition, atmospheric turbulence is not a dominant issue, as in conventional open loop systems, as the laser beam is never fed forward under open loop conditions. In addition, thermal image distortion, aerosol and optics backscatter are avoided, as the target is viewed through a path separate from that of the laser beam.

Figure 6:
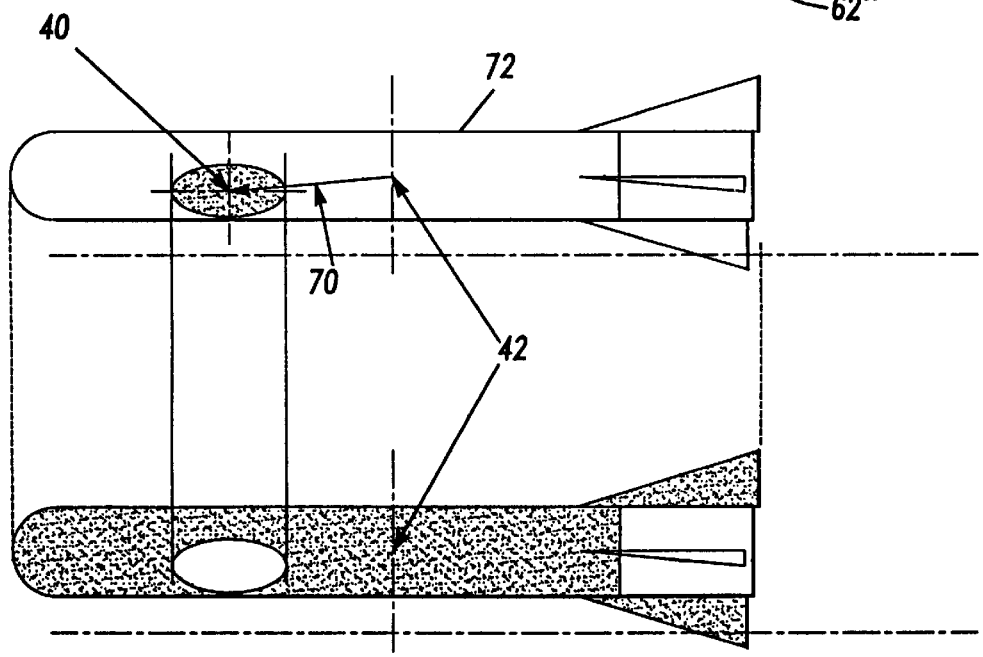
FIG. 6 is a schematic diagram illustrating the co-registration of the target image and the laser hit spot position on the target as detected by the tracker shown in FIG. 2.

FIG. 6 illustrates the relationship between how the target 72 and the laser hit spot are separately detected and converted into binary images by the first and second imagers, respectively. The beam displacement, represented by the arrow 70, represents the offset of the laser hit spot 40 from the target aimpoint 42 which the closed loop beam steering system of the present invention seeks to minimize.

Figure 7:
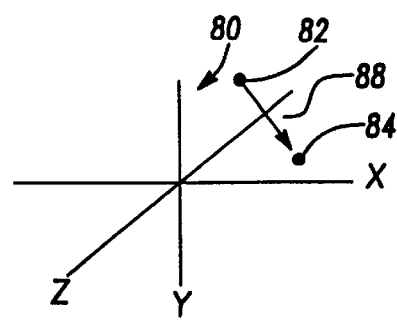
FIG. 7 is a vector representation of the difference between the detected laser hit spot position and the detected target position that the tracker of the present invention seeks to minimize.

Referring to FIG. 7, a coordinate system representative of the one generated by the tracker 28 is shown at 80. While the coordinate system 80 is labeled in Cartesian coordinates, it should be appreciated that the system could be implemented with any reference coordinates, including spherical or polar coordinates, depending upon the specific programming techniques used. A point 82 generated by the pointer controls in response to the electrical signals 60 represents the relative spatial location of the target aimpoint on the missile in the coordinate system. A point 84 generated by the pointer controls in response to the electrical signals 62 represents the relative instantaneous spatial location of the laser hit spot on the missile in the coordinate system. A vector representing the distance between the target aimpoint and the laser hit spot is shown at 88. The pointer controls are programmed by conventional programming techniques to drive the difference vector 88 to zero, and to maintain the difference vector at zero, until the tracking application is complete.

Figure 8:
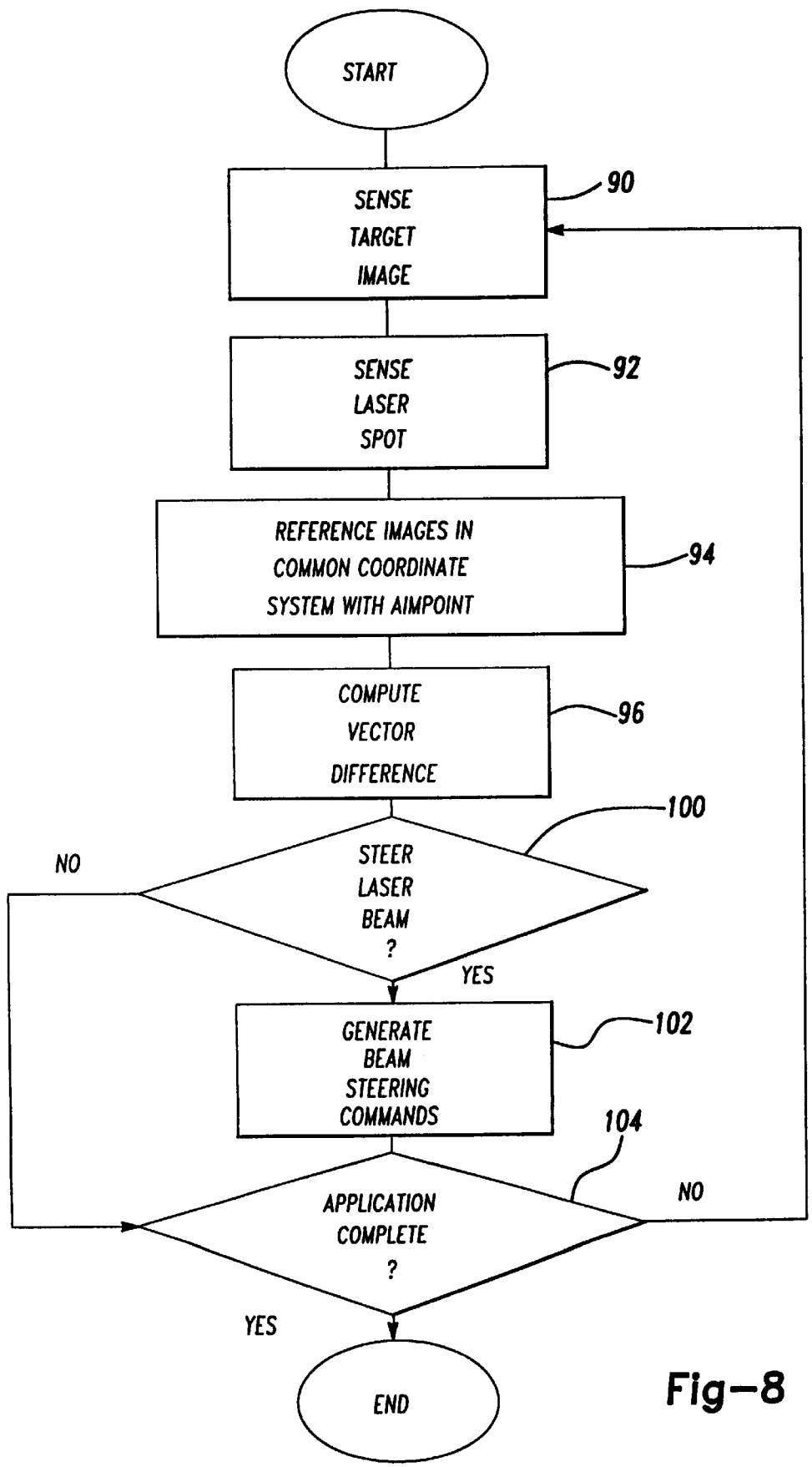
FIG. 8 is a flow diagram illustrating the methodology associated with the tracker of the present invention.

FIG. 8 is a flow diagram illustrating the methodology programmed into the tracking electronics of the present invention. At step 90, the tracker senses the target image in a manner that minimizes the imaging influence of the laser hit spot on the target image. At step 92, the tracker senses the laser hit spot in a manner that minimizes the imaging influence of the target image on the laser hit spot. At step 94, the methodology programmed into the pointer controls references the images of the target and the laser hit spot in the common coordinate system 80 along with a target aimpoint. At step 96, the methodology computes a difference vector representing the distance between the target aimpoint and the laser hit spot.

At step 100, the methodology determines if the laser beam must be steered in response to the difference vector. If the vector distance has a non-zero value, at step 102, the pointer controls generate beam steering commands and output the commands to the beam pointer. The beam pointer then steers the laser beam toward the desired target aimpoint and drives the difference vector to zero. If the difference vector has a zero value, the methodology proceeds to step 104, and determines if the application is complete. If so, the application ends. If not, the methodology returns to step 90 and repeats to close the loop between the target aimpoint and the laser hit spot, thereby driving the difference vector to zero.

It is contemplated that the system of the present invention may also be utilized as a self-referencing tracker. For example, such a tracker could include a target designator that would allow an operator to scan a potential target area and almost instantaneously lock on to a target, and, preferably, a vulnerable portion of the target.

As can be appreciated from the foregoing, the tracker of the present invention allows a laser beam to be locked onto a desired target aim point and maintained at the aim point indefinitely. The self-referencing imaging system of the present invention provides maximum noise immunity from atmospheric optical turbulence, as the position of the laser beam is measured relative to the target position. The system of the present invention thereby increases the accuracy of an associated laser weapon, as the system allows the laser weapon to attack the weakest point of a target, as the tracker does not depend on target glint for tracking purposes. The system of the present invention also increases the range of a laser weapon, as the system is not limited by the tracker image detector.

Various other advantages of the present invention will become apparent to those skilled in the art after having the benefit of studying the foregoing text and drawings, taken in conjunction with the followings claims.

What is claimed is:

1. A method of aiming a laser weapon, comprising the steps of:
    A) selecting an aimpoint on a target as a target aimpoint;
    B) engaging the target with a laser beam;
    C) receiving target scene information as radiation to be imaged;
    D) separating the received target scene information into target image radiation information and target hit spot radiation information;
    E) detecting a target image from the target image radiation information formed during step D);
    F) detecting a target laser hit spot as the location on the target that the laser beam engages the target from the target hit spot radiation information formed during step D);
    G) determining a vector distance between the target aimpoint and the target laser hit spot; and
    H) driving the vector distance to zero to make the target aimpoint and the target laser hit spot coincide with each other.

2. The method of claim 1, further comprising the steps of:
    generating a common coordinate system for both the target aimpoint and the target laser hit spot; and
    co-registering the target image and the target laser hit spot in the common coordinate system to facilitate performing step (G).

3. The method of claim 1 wherein the step of separating the received target scene information includes using a controlled reflectance mirror applied to the target scene information.

4. The method of claim 1 wherein the step of separating the received target scene information includes filtering the target scene information to minimize the influence of radiation from the target on the target laser hit spot; and
    filtering the target scene information to minimize the influence of radiation from the target laser hit spot on the target image.

5. The method of claim 1 wherein the steps of detecting further comprise the steps of:
    imaging the target image radiation information at a target scene radiation sensitive sensor; and
    imaging the target hit spot radiation information at a laser hit spot radiation sensitive sensor.

6. A laser weapon system for targeting a target, said target having a predetermined target aimpoint, comprising:
    a laser generator that generates a laser beam, the laser beam engaging the target and forming a target laser hit spot thereon;
    an imaging system that is responsive to radiation received from a target scene including the target, said imaging system separating the target scene radiation into target image radiation and target laser hit spot radiation, said imaging system generating separate images of the target scene and the target hit spot;
    a processor that determines a vector distance between the target aimpoint and the target laser hit spot based on the separated target scene image and the target hit spot image, said processor generating beam steering commands correlating to the vector distance; and
    a beam steering device that receives the beam steering commands and adjusts the laser beam generator in a manner that drives the vector distance to zero, and that maintains the vector distance at zero, to lock the laser beam on the target aimpoint.

7. The system of claim 6, wherein the imaging system minimizes the influence of the laser hit spot on the target scene image and the target influence on the target hit spot image to increase system target engagement accuracy.

8. The system of claim 6, further comprising a register in operative communication with the processor that simultaneously registers data from the target scene image and the target hit spot image to increase system accuracy.

9. The system of claim 6, wherein the imaging system comprises a first detector that detects the target image radiation, and a second detector that detects the target laser hit spot radiation.

10. The system of claim 6, wherein the processor generates a common coordinate system for both the laser hit spot and the target image to determine the vector distance between the laser hit spot and the target image.

11. The system according to claim 6 wherein the imaging system includes a controlled reflectance mirror to separate the target image radiation and the target laser hit spot radiation.

12. A closed loop method of tracking a target, comprising the steps of:
    engaging a target with a laser beam to form a laser hit spot thereon;
    detecting target scene information from a scene that includes the target;
    generating an image of the target scene and an image of the laser hit spot that are separate;

co-registering the target scene and laser hit spot images in a common coordinate system to determine an instantaneous position of the laser hit spot with respect to the target;

steering the laser beam toward a desired target aimpoint on the target in response to the step of co-registering the target scene and laser hit spot images; and repeating the above steps until a vector distance between the target aimpoint and the laser hit spot is driven to zero.

13. The method of claim 12, further comprising the step of maintaining the laser hit spot on the target aimpoint after the vector distance between the target aimpoint and the laser hit spot is driven to zero.

14. The method of claim 12, wherein the steps of detecting target scene information and generating an image in a manner that produces separate target scene and laser hit spot images further comprising the steps of:

minimizing the effect of the target scene image on the laser hit spot image; and minimizing the effect of the laser hit spot image on the target scene image.

15. The method according to claim 12 wherein detecting target scene information includes separating the target scene information into target scene radiation and laser hit spot radiation, and using the separated target scene radiation and laser hit spot radiation to separately generate the image of the target scene and the image of a laser hit spot.

16. The method according to claim 15 wherein separating the target scene information includes using a controlled reflectance mirror to reflect target scene radiation.

* * * * *